United States Patent
Gyory et al.

[15] 3,671,048
[45] June 20, 1972

[54] LIP TYPE SEAL

[72] Inventors: Emeric J. Gyory, Park Ridge; Otmar E. Teichmann, Lincolnwood, both of Ill.

[73] Assignee: Borg-Warner Corporation, Chicago, Ill.

[22] Filed: June 12, 1970

[21] Appl. No.: 45,748

[52] U.S. Cl. ..................................................277/227
[51] Int. Cl. .......................................................F16j 15/32
[58] Field of Search.............277/227, 230, 231, 223, 178; 401/198; 15/210 B

[56] References Cited

UNITED STATES PATENTS

| 2,977,143 | 3/1961 | Talamonti | 277/178 |
| 3,355,239 | 11/1967 | Albrecht | 401/198 |
| 2,736,585 | 2/1956 | Reising | 277/223 X |

*Primary Examiner*—Robert I. Smith
*Attorney*—Donald W. Banner, William S. McCurry and John W. Butcher

[57] ABSTRACT

A lip type seal adapted to provide a seal between a housing and a relatively rotatable shaft including a sealing lip in sealing engagement with the shaft. The lip includes a non-woven mat of randomly disposed interconnected fibers of a synthetic polymer such as polytetrafluoroethylene, polyester, polyamide or the like impregnated with a synthetic elastomer such as oleophobic silicone rubber. Fibers forming the mat are partially exposed at the lip for contact with the shaft.

5 Claims, 6 Drawing Figures

PATENTED JUN 20 1972 3,671,048
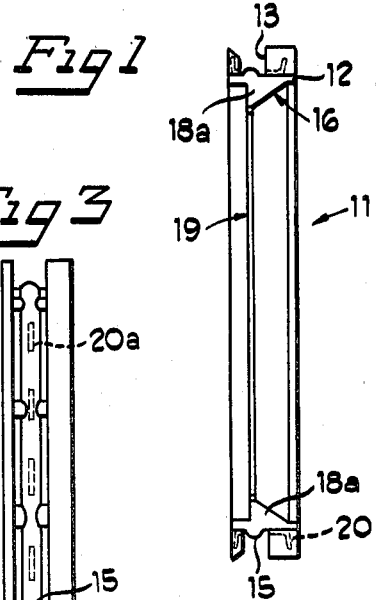
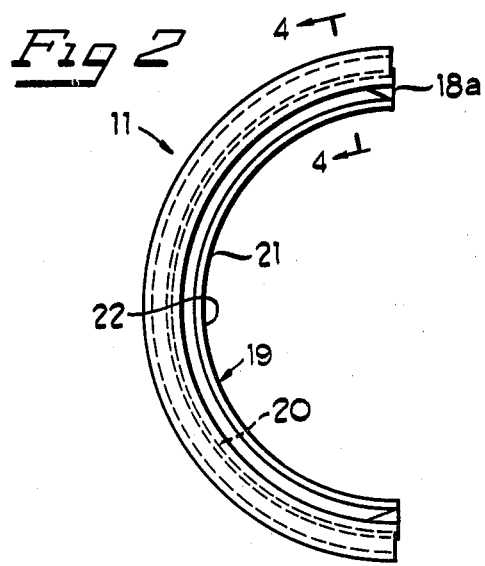
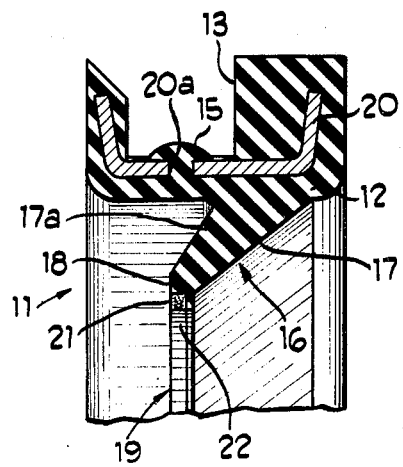
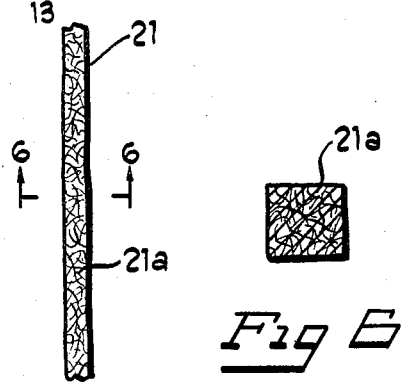
INVENTORS
EMERIC J. GYORY
OTMAR E. TEICHMANN
BY Dennis McWilliams
ATTORNEY

LIP TYPE SEAL

BACKGROUND OF THE INVENTION

This invention relates to a lip type seal. More particularly, it relates to a lip type seal having a composite lip including a fibrous element in sealing contact with the relatively rotatable shaft to reduce frictional forces.

Lip type seals are commonly used in providing a fluidtight seal between a housing and a relatively rotatable shaft. A typical application of such a seal is the oil seal of an automotive engine between the engine block and the crankshaft.

Originally, seals of this general type were formed entirely of a resilient material which was compatible with the fluid to be sealed. For example, crankshaft seals were usually formed of elastomers which would withstand prolonged exposure to oil and high temperature.

Factors such as relatively high operating friction, loss of resiliency due to high temperature operation, and development of high friction at start-up due to loss of lubricant film during idle periods adversely affected seal life. Persistent efforts have been directed toward solving these problems to maximize seal service life.

One such development is exemplified by the seal shown in U.S. Pat. No. 2,977,143, titled "Oil Seal with Filamentary Lip," issued Mar. 28, 1961. The lip portion of the seal shown in the patent included a fibrous wick of lineally aligned strands in the form of a yarn or string disposed for sealing engagement with the rotatable shaft. The string was oil absorbent and retained lubricant at the area of contact between the lip and the shaft. This minimized frictional forces and oil retained by the wick prevented high friction start-up after long periods of inoperation. The above arrangement did not prove to be entirely satisfactory due to the inelasticity of the string and eventual deterioration of the fibrous element.

More recent attempts to optimize lip seal design have relied upon the use of low friction polymers such as polytetrafluoroethylene, polyamide, polyester, etc., for purposes of reducing frictional forces between the seal lip and the shaft.

Utilization of such materials for the entire seal was not practical due to extremely high material cost. Further, lip seals formed entirely of these low friction polymers lacked the necessary resiliency to provide adequate sealing forces.

Attempts were made to use shaft contacting inserts formed of low friction polymers supported in sealing association with a shaft by a resilient backing member.

Seals of this type did not, however, eliminate all difficulties. It was necessary to provide a seal between the insert and the supporting base. Further, the relative inelasticity of the material and the tendency to "cold flow" resulted in rapid loss of sealing force. Further, materials of this type characteristically have relatively high coefficients of thermal expansion as compared to metal such as steel. Therefore, during operation, unequal expansion would occur resulting in undesirable distortion and leakage.

Further attempts to utilize low friction synthetic polymers included the combining of particles of the material with an elastomer to realize the advantages of both materials. Finely divided particles of a polymer such as polytetrafluoroethylene were mixed with the elastomeric material which was then vulcanized to form a resilient composite mass.

The surface in contact with the relatively rotating element would therefore include exposed particles of low friction material and necessary resiliency was provided by the elastomeric base.

Problems were encountered in obtaining proper mixture of materials without severely reducing the strength of the supporting base. Also, the elastomer would not bond to the particles and it was necessary to etch the surface of the particles to obtain a mechanical bond. Operation of the relatively rotatable element against the surface of the seal dislodged the particles from the supporting base material and the advantages of the composite material were short-lived.

Accordingly, it is the principal object of the present invention to provide an improved lip type seal having a composite sealing lip that includes low friction polymeric fibers exposed for contact with the relatively rotating sealing surface. The seal of the present invention minimizes the frictional forces between the sealing lip and relatively rotatable element by the presentation of exposed low friction material at the area of contact, and further by entrapment of lubricant at the sealing area. The resilient base of the seal provides the necessary sealing force to insure efficient seal operation, even at elevated temperature operation.

SUMMARY OF THE INVENTION

Very generally, the present invention is directed to a lip type seal having a sealing lip including a non-woven mat of randomly disposed interconnected fibers of a low friction polymer impregnated with elastomeric material. Fibers of the low friction polymer are partially exposed at the sealing surface for contact with the relatively rotating surface. The matted relationship of the fibers precludes dislodgement of the low friction material at the exposed surface, insuring prolonged effective operation. The exposed fibers and elastomeric base define minute pockets to retain lubricant in the contact area to minimize friction at start-up.

More particular objects and advantages of the present invention will become apparent with references to the following description and accompanying drawings.

DESCRIPTION OF DRAWINGS

FIG. 1 is a front elevational view of a seal embodying the present invention;

FIG. 2 is a side elevational view of the structure of FIG. 1;

FIG. 3 is a rear elevational view of the structure of FIG. 1;

FIG. 4 is an enlarged cross-sectional view, taken along the line 4—4 of FIG. 2;

FIG. 5 is a plan view of an impregnated felt mat illustrated for carrying out the present invention; and FIG. 6 is an enlarged cross-sectional view, taken on the line 6—6 of FIG. 5.

DESCRIPTION OF ILLUSTRATED EMBODIMENT

Referring in detail to the illustrative construction shown in the drawings, numeral 11 indicates a lip type seal including an arcuate half-circular body 12 molded of synthetic rubber, having a high degree of resistance to lubricants and other foreign substances, as well as to heat and cold. A half annulus is here shown, and it is to be understood that the seal may be molded in sections, each half-circular or in substantially complete circle with a single split therein.

The outer edge of the arcuate body 12 is provided with a peripheral groove 13, by which the seal may be mounted to interlock with a marginal flange of a housing through which a rotatable shaft extends. A compression hump or bead 15, best seen in FIG. 3, is formed in the groove 13 to enhance the engagement when the seal is forced onto the marginal flange against the resilience of the rubber body 12. The peripheral groove 13 is slightly narrower than the thickness of the marginal flange of the housing.

On the inner periphery of the arcuate body 12 is an integral sealing lip 16 which is tapered on one side, its outer side, as at 17, and slightly less tapered, as at 17a, on its opposite side, the latter merging into a short straight face 18. At the ends of the arcuate half-circular body 12 are the abutment faces 18a.

The convergence of the two sides 17 and 17a form a sealing lip termination 19, constituted as later described, that defines an arc in a plane radially aligned with the peripheral groove 13.

To reinforce the body 12, an arcuate metal insert 20 is shown, of channel form, molded into the body 12. The channel includes a plurality of slots 20a to ensure complete filling of the bead configuration during molding.

In accordance with the present invention, the sealing lip termination 19 includes a non-woven mat of randomly disposed, interconnected fibers of a low friction polymer impregnated with a synthetic elastomer. The mat, generally designated 21, is disposed such that it defines a shaft contacting surface 22.

The mat is made from low friction polymeric fibers, for example, polytetrafluoroethylene, polyamide, or polyester, using conventional felt-making processes. It includes fibers 21a randomly distributed within the felt mat, lying in multiplanar relationships to one another. The random fibers are interconnected to resist displacement of individual fibers from the mat. The mat, however, possesses sufficient porosity to accommodate impregnation with the elastomeric material.

The random relationship of the fibers provides an exposed contact surface 22 which includes a variation of self-lubricating and non-self-lubricating areas in contact with the sealing surface of the rotating shaft. This arrangement of the fibers and elastomeric base at the contact surface 22 not only provides a significant degree of self-lubrication, but also provides for entrapment of lubricant between adjacent fibers to further minimize frictional forces.

The interconnection of fibers prevents dislodgement of the low friction fibers during operation, and further accommodates the elastic action of the base when the seal is initially installed, and when the seal undergoes temperature change.

The synthetic elastomer impregnant must be of an oleophobic type to impart a good oil-sealing property in the critical lip seal area. A synthetic elastomer having such desirable properties is an oleophobic silicone rubber. The amount of impregnant is adjusted to provide between 30 percent and 70 percent exposed fibers when the mat is sliced into a strip, such as that shown in FIGS. 5 and 6. It has been found that approximately 50 percent exposed fibers is the preferred ratio.

The felt or mat 21, for example, comprises polytetrafluoroethylene fibers impregnated with room temperature vulcanizing oleophobic silicone rubber diluted with solvent. Any suitable solvent may be used, such as tetrahydrofurane, methyl-ethyl ketone, xylene, or the like.

The impregnated felt mat is cured and cut into strips, square in cross section, as shown in FIG. 6. The strips are placed in the lip seal position of a lip seal forming mold. The mold is then filled with a conventional seal elastomer, typically silicone rubber. For applications requiring a high degree of chemical inertness, a fluorinated elastomer may be used. The combination is then cured and vulcanized. By virtue of the compatible nature of the elastomer and the impregnant, the felt becomes integrally bonded to the body of the oil seal structure.

The present invention provides a lip type seal having excellent properties of self-lubrication, oil-wetting lubrication, resilience, non-abrasiveness, integrated structure, oil sealing, chemical inertness, temperature resistance, pressure resistance, wear resistance, and low friction, the combination of which has not been available heretofore in oil seals.

The various features of the invention described herein are for illustrative purposes only. It is understood that the scope is not limited by the specific embodiments shown but rather is defined by the appended claims.

What is claimed is:

1. A lip type seal including a resilient body for sealing engagement with a housing and a sealing lip defining a contact surface for sealing engagement with a relatively rotatable shaft, said lip including a resilient composite mass of a non-woven mat of randomly disposed interconnected fibers of a low friction polymer impregnated with a synthetic elastomer, said fibers being partially exposed at said contact surface.

2. A lip type seal as claimed in claim 1, wherein said fibers are formed of polytetrafluoroethylene.

3. A lip type seal as claimed in claim 1, wherein said synthetic elastomer is silicone rubber.

4. A lip type seal as claimed in claim 1, wherein from about 30 percent to about 70 percent of said contact surface is defined by said exposed fibers.

5. A lip type seal as claimed in claim 4, wherein approximately 50 percent of said contact surface is defined by said exposed fibers.

* * * * *